United States Patent [19]
Rogers

[11] 3,929,121
[45] Dec. 30, 1975

[54] SOLAR HEAT COLLECTOR

[76] Inventor: Bruce C. Rogers, 915 Georgetown Road, Salem, Ohio 44460

[22] Filed: Aug. 1, 1974

[21] Appl. No.: 493,566

[52] U.S. Cl. .................................. 126/271; 237/1 A
[51] Int. Cl.² ............................................. F24J 3/02
[58] Field of Search ............ 126/270, 271; 237/1 A; 350/292

[56] References Cited
UNITED STATES PATENTS

| | | | |
|---|---|---|---|
| 695,136 | 3/1902 | Baker | 126/271 |
| 937,013 | 10/1909 | Severy | 126/271 |
| 1,130,871 | 3/1915 | Willsie | 126/271 |
| 2,902,028 | 9/1959 | Manly | 126/271 |
| 2,920,710 | 1/1960 | Howard | 126/270 |
| 3,376,165 | 4/1968 | Abbot | 126/270 |

FOREIGN PATENTS OR APPLICATIONS

| | | | |
|---|---|---|---|
| 1,141,261 | 4/1957 | France | 126/271 |

*Primary Examiner*—Kenneth W. Sprague
*Assistant Examiner*—James C. Yeung
*Attorney, Agent, or Firm*—Webster B. Harpman

[57] ABSTRACT

A solar heat collector positions a flat lens panel in spaced relation to a collector panel having a plurality of interconnected heat collector elements through which a fluid medium to be heated is circulated. Individual lenses in the panel focus on the individual heat collector elements and dark colored heat collecting partitions therein. Flat Fresnel's lenses formed in accordance with Fresnel's reflection formula in inexpensive, transparent, synthetic resin material are preferred.

6 Claims, 2 Drawing Figures

SOLAR HEAT COLLECTOR

BACKGROUND OF THE INVENTION

1. Field of the Invention

This invention relates to solar heat collectors of the type normally employed to heat a fluid medium by sunlight.

2. Description of the Prior Art

Prior structures of this type usually employ an insulated container having a transparent wall and fluid conducting means therein. Such as for example in U.S. Pat. Nos. 2,202,756 and 2,705,948. Variations of this arrangement are found in U.S. Pat. Nos. 1,801,710 and 1,855,815. Lenses incorporated in the insulated enclosure and generally in closely spaced relation to the means for the circulating fluid medium are seen in U.S. Pat. Nos. 1,093,498, 1,673,429 and 2,902,028.

A similar device incorporating reflectors but eliminating the lenses may be seen in U.S. Pat. No. 2,467,885 and a device having both lenses and reflectors focused on a single fluid medium carrier is disclosed in U.S. Pat. No. 1,683,266.

This invention provides a plurality of lenses spaced with respect to a plurality of heat collector elements a distance approximating the focal depth of the lenses employed so that the heat collecting elements and the dark colored partitions therein receive greatly magnified sunlight at relatively high temperatures.

SUMMARY OF THE INVENTION

A solar heat collector includes a frame having a lens panel and a heat collector element panel in spaced relation and means for circulating fluid to be heated through the heat collecting elements together with means for rotating the solar heat collector on its vertical axis and means for tilting the solar heat collector from a near horizontal position to an angled position of approximately 45° from horizontal. Flat, inexpensive, plastic, Fresnel lenses focus sunlight on the individual heat collectors to attain an efficient rapid heating of the fluid being circulated through the individual heat collector elements which are preferably interconnected in a series relation.

DESCRIPTION OF THE PREFERRED EMBODIMENT

Figure 1:
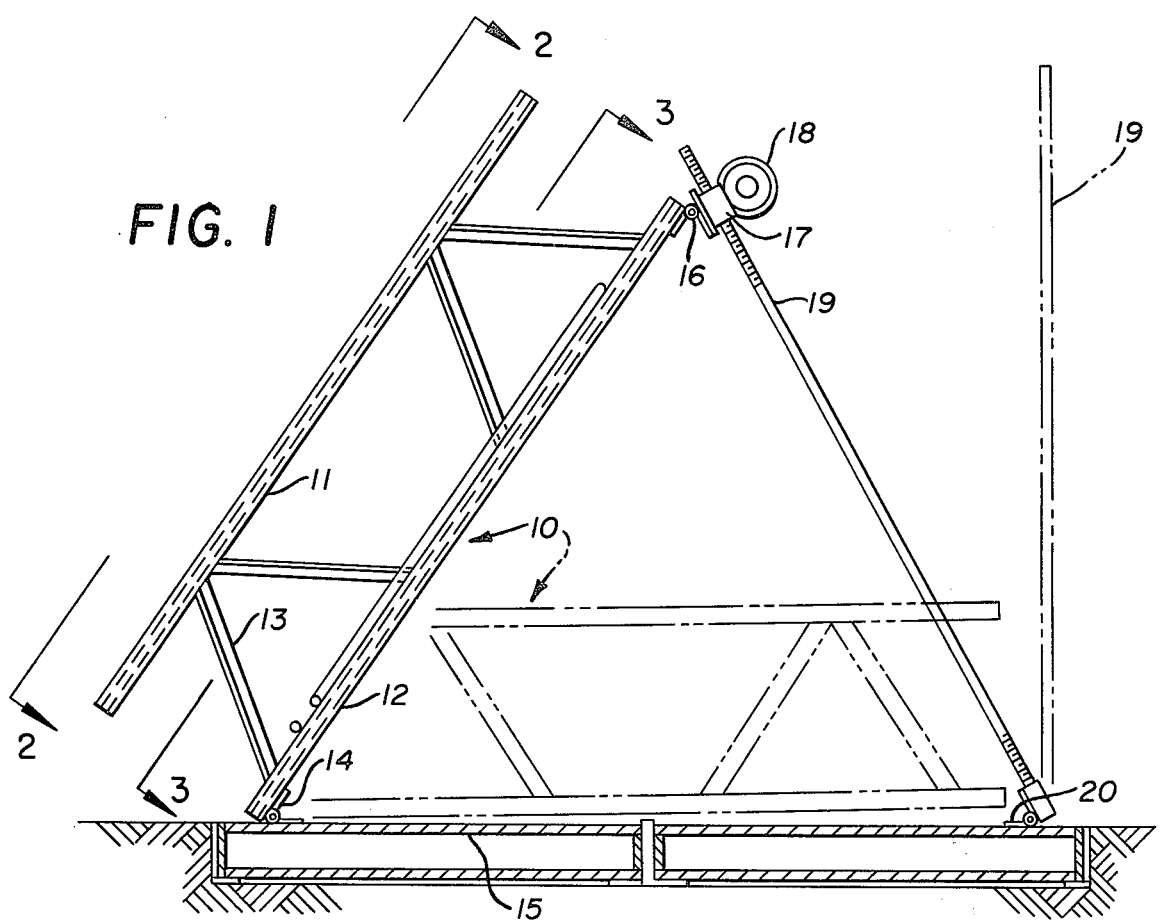
FIG. 1 is a side view of the solar heat collector with parts broken away and parts in broken lines indicating alternate positions.
Figure 2:
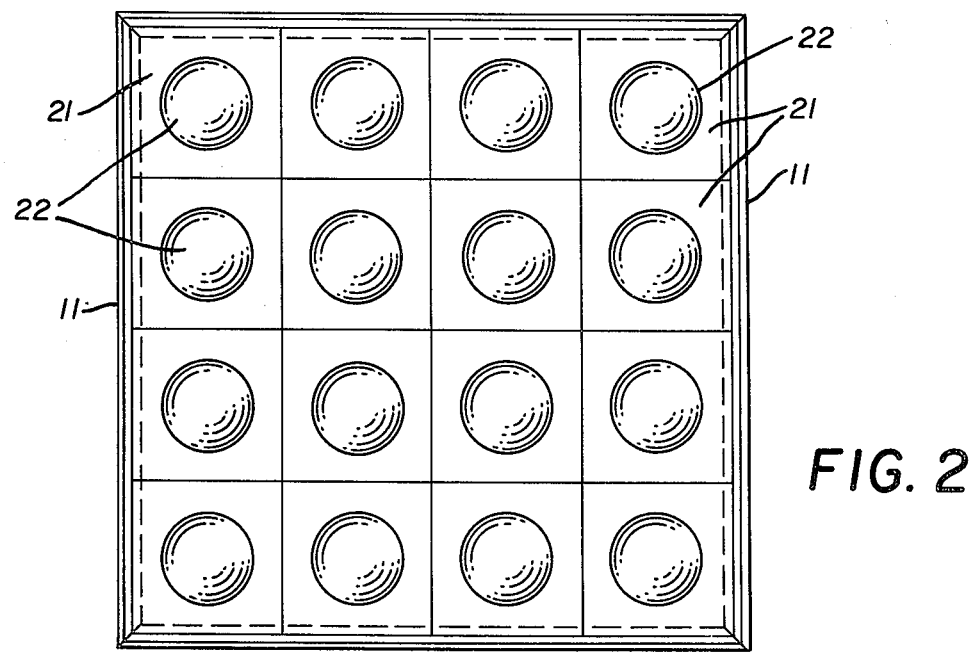
FIG. 2 is a plan view on line 2—2 of FIG. 1.
Figure 3:
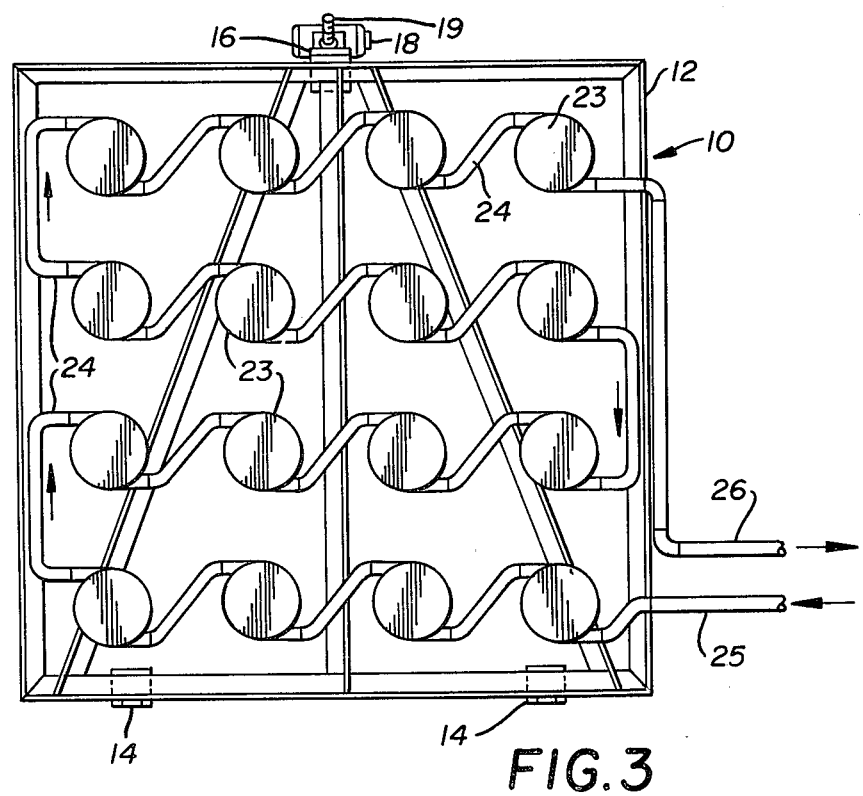
FIG. 3 is a plan view on line 3—3 of FIG. 1.
Figure 4:
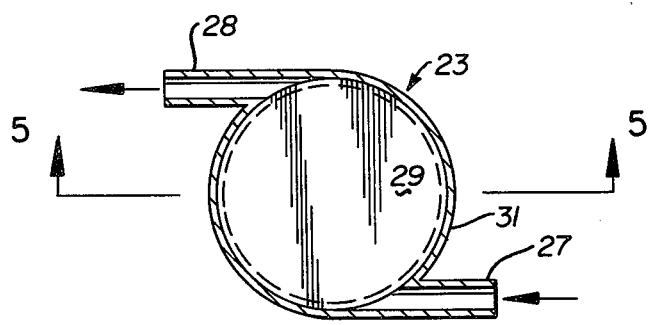
FIG. 4 is an enlarged transverse section of one of the heat collector elements seen in FIG. 3.
Figure 5:
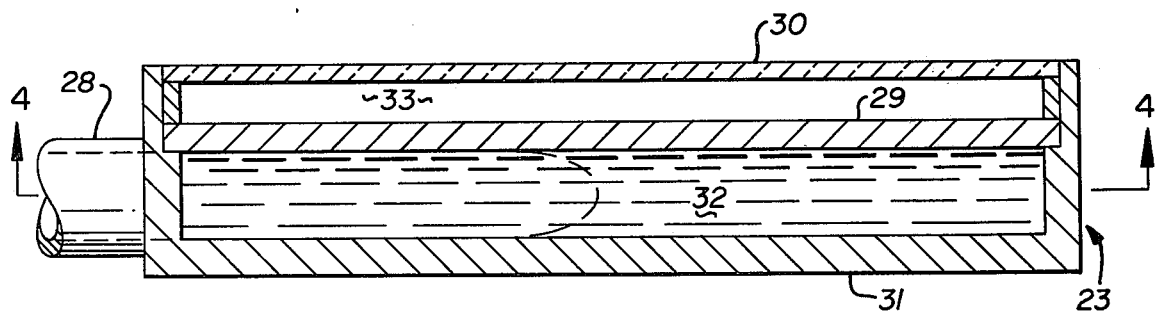
FIG. 5 is an enlarged section on line 5—5 of FIG. 4.

In the form of the invention chosen for illustration the solar heat collector comprises a frame 10 as seen in FIG. 1 of the drawings, having a lens supporting portion 11 and a heat collector element supporting portion 12 spaced by a plurality of frame members 13. In plan view as seen in FIGS. 2 and 3 of the drawings which are taken on lines 2—2 and 3—3 of FIG. 1 respectively, the frame is substantially square. It is hinged at one of its ends by hinges 14 to a rotatable base 15 which is rotatable on its vertical axis. The opposite side of the frame 10 is secured by a secondary hinge 16 to a bracket 17 which carries an electric motor 18 and a gear reduction unit driven thereby and engaged on a threaded shaft 19 which in turn is hinged at its lower end by a third hinge 20 also secured to the rotatable base 15.

Broken lines in FIG. 1 of the drawings indicates the positioning of the solar heat collector in an alternate position to that shown in solid lines and it will occur to those skilled in the art that the solar heat collector thus supported can follow the sun.

By referring now to FIG. 2 of the drawings, a plan view of the lens supporting portion 11 of the frame 10 may be seen to position a plurality of flat sections 21 of transparent plastic material in which Fresnel lens configurations 22 have been formed such as by molding the same integrally with the plastic material and as will be understood by those skilled in the art.

By referring now to FIG. 3 of the drawings, a plan view of the heat collector elements supporting portion 12 of the frame 10 may be seen supporting a plurality of heat collector elements 23 interconnected in series with suitable fluid carrying tubing 24 so that fluid medium to be heated enters as shown by the arrows in FIG. 3 of the drawings at 25 and flows successively through the plurality of heat collecting elements 23 and leaves at point 26. Each of the heat collecting elements 23 is preferably a thin, flat, two-part glass bulb having oppositely disposed and tangentially arranged inlet and outlet portions 27 and 28 with a transverse dark colored partition 29 positioned in spaced relation with respect to the front and back portions 30 and 31 of the heat collecting element 23.

The dark colored heat collecting partition 29 forms two chambers in each of the heat collecting elements 23. The larger of these chambers is indicated by the numeral 32 and communicates with the tangentially positioned inlet and outlet 27 and 28 respectively, the arrangement being such that fluid entering the heat collecting element is confined to the larger chamber 32 where it wipes the one surface of the dark colored heat collecting partition 29. The partition 29 is sealed with respect to the back portion 31 of the heat collecting element 32 and the front portion 30 of the heat collecting element 23 is spaced with respect to the partition 29 and sealed to the annular flange forming the peripheral edge of the back portion 31 so that a dead-air space or a partial vacuum chamber 33 results to insure against loss of heat directed against the partition 29 by the lenses 22 as hereinbefore described.

Those skilled in the art will observe that when the plurality of lenses 22 are spaced desirably with respect to the heat collector elements 23 the focul points of the lenses 22 are on the partitions 29 so that the same are heated rapidly to a very high temperature by the magnified sunlight.

It will occur to those skilled in the art that it may be desirable to provide insulation on the back side of each of the heat collecting elements 23 to insure against heat loss therefrom and that the communicating means 24 interconnecting the elements 23 may also be suitably insulated. Flexible insulated hoses may be incorporated in the fluid supplying and delivering means so that the movement of the solar heat collector will not interfere with the efficient circulation of the fluid through the device.

The above described solar heat collector structure provides relatively easy and fast adjustments so as to enable it to follow the sun and operate at maximum efficiency and it concentrates the magnified sunlight from each of the plurality of lenses 22 in the individual heat collecting elements 23 in a highly effective manner. The construction of each of the heat collecting elements 23 to incorporate the tangentially positioned inlet and outlet openings prevents direct flow through of the fluid being heated as the same spins in the transversely flat chamber 32 of each of the elements to provide a suitable time factor for the absorption of heat from the dark colored heat collecting partition 29 therein.

Although but one embodiment of the present invention has been illustrated and described, it will be apparent to those skilled in the art that various changes and modifications may be made therein without departing from the spirit of the invention.

Having thus described my invention what I claim is:

1. In a solar heat collector having a plurality of heat collecting elements, each of which comprises a round hollow transparent member having spaced flat top and bottom walls with a peripheral wall joining their annular edges, inlet and outlet openings in said peripheral wall, at least one of said inlet and outlet openings tangentially arranged with respect to said peripheral wall, means for circulating fluid to be heated successively through said heat collecting elements and a plurality of light magnifying lenses each of which is arranged in spaced parallel relation to one of said heat collecting elements and spaced with respect thereto a distance equal to the focus depth of light passing through said lens so that said magnified light is at its maximum magnification on said heat collecting element.

2. The improvement in a solar heat collector set forth in claim 1 and wherein a dark colored heat collecting member is disposed transversely in said heat collecting element in spaced relation to said flat top and bottom walls and wherein said lens focuses light at its maximum magnification on said dark colored heat collecting member.

3. The improvement in a solar heat collector set forth in claim 1 and wherein said tangentially arranged inlet and outlet openings are circumferentially spaced in said peripheral wall.

4. The improvement in a solar heat collector set forth in claim 2 wherein each of said heat collecting elements is a hollow device with spaced top and bottom walls at least one of which is transparent and at least one of which has an integral peripheral flange joining the other, said heat collecting elements arranged in spaced relation and tubing interconnecting said heat collecting elements in series relation and forming part of said means for circulating said fluid.

5. The improvement in a solar heat collector set forth in claim 1 and wherein each of said heat collecting elements is substantially smaller in size than each of said lens focused thereon.

6. The solar heat collector of claim 1 and wherein said lens are Fresnel lens in a flat, transparent material.

* * * * *